United States Patent [19]

Hanada et al.

[11] Patent Number: 4,719,558

[45] Date of Patent: Jan. 12, 1988

[54] HIGH-FREQUENCY POWER SUPPLY OUTPUT CONTROL DEVICE

[75] Inventors: Isamu Hanada; Pierre Savary, both of Osaka; Satoshi Nagai, Kobe; Munetomo Sagawa, Osaka, all of Japan

[73] Assignee: Kyoei Densoku Co., Ltd, Osaka, Japan

[21] Appl. No.: 922,691

[22] Filed: Oct. 24, 1986

[51] Int. Cl.$^4$ ............................................. H02M 7/219
[52] U.S. Cl. ........................................ 363/98; 363/56; 363/132
[58] Field of Search ..................... 363/55, 56, 98, 132; 361/100

[56] References Cited

U.S. PATENT DOCUMENTS

| | | | |
|---|---|---|---|
| 4,454,573 | 6/1984 | Petsch et al. | 363/98 |
| 4,546,422 | 10/1985 | Okado | 363/56 X |
| 4,597,026 | 6/1986 | Santurtûn et al. | 361/100 X |
| 4,621,312 | 11/1986 | Yuzurinara et al. | 363/132 X |

OTHER PUBLICATIONS

Application Note 946, Chp. 12, pp. A-111-A122, 1982, IEEE Indust. App., Society Conference By Clemente et al.

High Freq. Power Conversion Conference & Executive Exhibit, 4/21-23/1987, Wash. D.C., Crystal Gateway By Savary et al.

Primary Examiner—Patrick R. Salce
Assistant Examiner—Kristine Peckman
Attorney, Agent, or Firm—Moonray Kojima

[57] ABSTRACT

The invention provides a novel high-frequency power-supply output control device comprising circuitry for activating push-and-pull operations of a pair of arms of semiconductive inverters comprised of semiconductors being connected to each other in a bridge configuration, in which each arm is alternately turned ON and OFF for converting DC current into high-frequency power, a pair of phase-synchronizing circuits which are respectively installed to these two arms for setting operative frequency of a pair of these arm-forming semiconductors at a specific value, and a phase-difference varying circuit capable of varying the phase difference of these phase-synchronizing circuits before eventually controlling the output high-frequency power ranging from zero to the maximum value being set.

2 Claims, 3 Drawing Figures

HIGH-FREQUENCY POWER SUPPLY OUTPUT CONTROL DEVICE

BACKGROUND OF THE INVENTION

The present invention relates to an output control device for a high-frequency power-supply unit capable of controlling power output from the power-supply unit which is used in a power-supply circuit loaded with a plasma generator, an induction heater, and a resonance circuit for example.

Conventionally, there is a semiconductor inverter which is used as a circuit for generating high-freqency power to allow a plurality of arms to respectively perform push-and-pull operations and alternately turn themselves ON and OFF before eventually converting the DC power into a specific high-frequency power.

Of a variety of conventional systems made available for controlling power output from the semiconductor inverter, there is a system for varying either voltage or current of power supplied to the semiconductive inverter by using a thyristor.

However, this system involves a complicated constitution which causes the power factor to eventually be lowered. In addition, due to slow speed in responding to variable load, elements may easily be destroyed by overcurrent when load is shorted or by overvoltage when load is freed.

Furthermore, there is another conventional system used for controlling power output from the semiconductive inverter, in which, if a resonance circuit makes up the load, frequencies output from the inverter are variably controlled.

When frequency output from the semiconductive inverter is identical to the resonance frequency output from the resonance circuit which substantially makes up load, the system designates this frequency to be the maximum output, i.e., the serial resonance. Based on this, the system variably controls the output from the semiconductive inverter by either raising the frequency output from this inverter to a specific level higher than the resonance frequency or conversely lowering it to a specific level lower than the resonance frequency.

Nevertheless, when the system variably controls the frequency output from the inverter to a level lower than the resonance frequency, a state of short-circuit can easily take place with the power during the recovery period of a fly-wheel diode that substantially makes up the inverter. Thus, conventionally, the output frequency is set to a level higher than the resonance frequency.

As a result, the system unavoidably needs to hold the resonance frequency of the resonance circuit at a specific level lower than the maximum operative frequency of the semiconductive inverter, thus operation of the resonance circuit making up the load can be constrained by operation of the semiconductive inverter itself.

Furthermore, variable characteristic of the power output from the resonance circuit making up the load is adversely affected by Q which is the aimed acuteness of resonance of this resonance circuit. In particular, when a lesser value of Q is present, even when raising the level of frequency output from the inverter, output power cannot fully be lowered. Conversely, when a greater value of Q is present, power output from the inverter can significantly be varied by even the slightest variation of the frequency, thus making it difficult for any of these conventional systems to correctly control the output power.

OBJECT OF THE INVENTION

The present invention relates to a high-frequency power-supply output control device for securely controlling power output from a semiconductive inverter comprising; a pair of phase-synchronizing circuits which are respectively provided for dealing with each of two arms of the semiconductive inverter in order to set operative frequency of a pair of semiconductive inverters making up these arms at a specific value, and a phase-difference-varying circuit for variably controlling the phase-difference between these two phase synchronizing circuits.

The primary object of the present invention is to provide a novel high-frequency power-supply control device featuring simplified constitution and higher power factor than any of the conventional output control systems using a thyristor and faster response to variable load.

The second object of the present invention is to provide a novel high-frequency power-supply output control device which easily and securely controls the power output by effectively controlling it independent of resonance frequency of the resonance circuit that makes up the load.

The third object of the present invention is to provide a novel high-frequency power-supply output control device capable of easily and securely producing power provided with an extremely high frequency, for example, 500 KHz., and the like.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENTS

Referring more particularly to the accompanying drawings, one of the preferred embodiments of the present invention is described below.

Accompanying drawings respectively denote the output control device related to high-frequency power-supply source. See FIGS. 1 and 2, in which four transistors Q1 through Q4 are connected to each other so that they form a full bridge, while each of these is respectively connected to fly-wheel diodes D1 through D4 in parallel.

The DC power-supply source E is connected to both ends of transistors Q1/Q2 and Q3/Q4 each making up arm A1 and Arm A2. The primary part T1 of power-output transformer T is connected to a point between arms A1 and A2, whereas the secondary part T2 of this transformer T is connected to resonance circuit LC functioning as load and being comprised of capacitor C1 and coil L1.

Each two units of transistors Q1/Q2 and Q3/Q4 which respectively make up arms A1 and A2 are driven by drive circuit B so that these can perform push-and-pull operations, while each two units of these transistors are alternately turned ON and OFF at 50% of the duty cycle.

Figure 2:
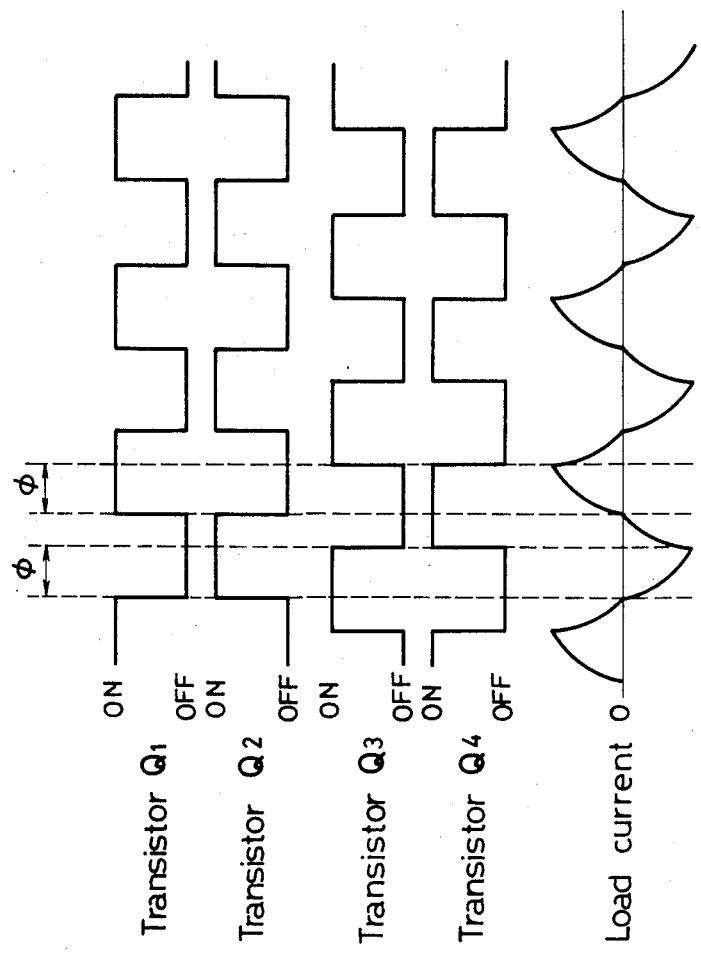
FIG. 2 is a timing chart denoting operations of the essential elements of the output control device shown in FIG. 1.

Concretely, as shown in FIG. 2, when driving a pair of transistors Q1 and Q4 or Q2 and Q3 alternately using phase difference $\phi$, load current shown in FIG. 2 flows through resonance circuit LC. More particularly, load current flows through resonance circuit LC in the direction shown below.

When transistors Q1 and Q4 are activated, load current flows in the direction from transistor Q1 to Q4.

When transistors Q2 and Q4 are activated, load current flows in the direction from diode D4 to transistor Q2.

When transistors Q2 and Q3 are activated, load current flows in the direction from transistor Q3 to Q2.

When transistors Q1 and Q3 are activated, load current flows in the direction from transistor Q1 to diode D3.

Consequently, no power is outputted while transistors Q1 and Q3 remain in the identical phase, whereas the maximum power is outputted while transistors Q1 and Q4 remain in the identical phase, and as a result, it is possible for the output control device related to the present invention to variably control the output power from zero to the predetermined maximum value by varying the phase difference $\phi$ between arms A1 and A2.

Figure 1:
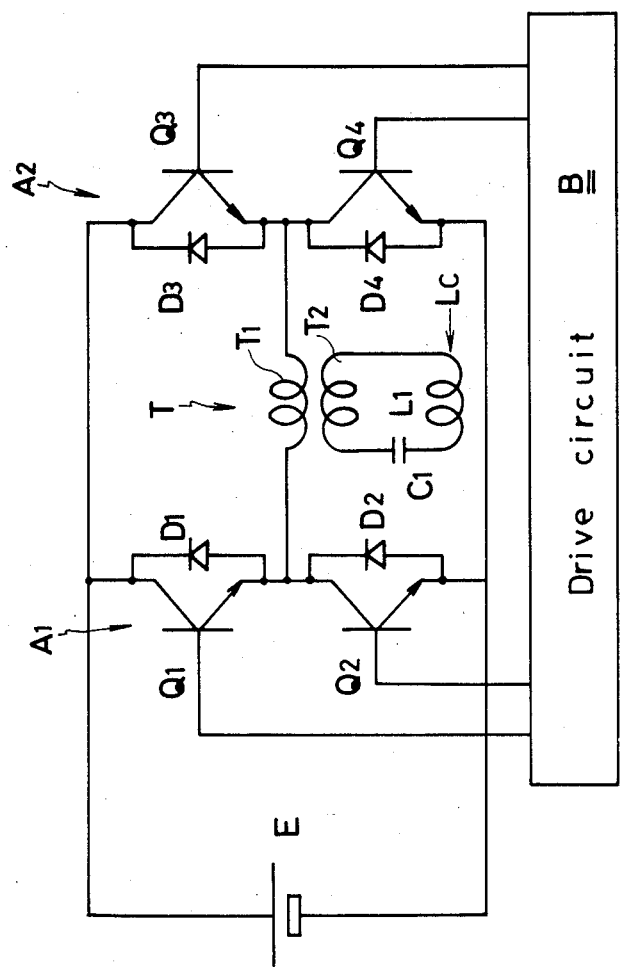
FIG. 1 is a simplified block diagram denoting the basic constitution of the high-frequency power-supply output control device related to the present invention.
Figure 3:
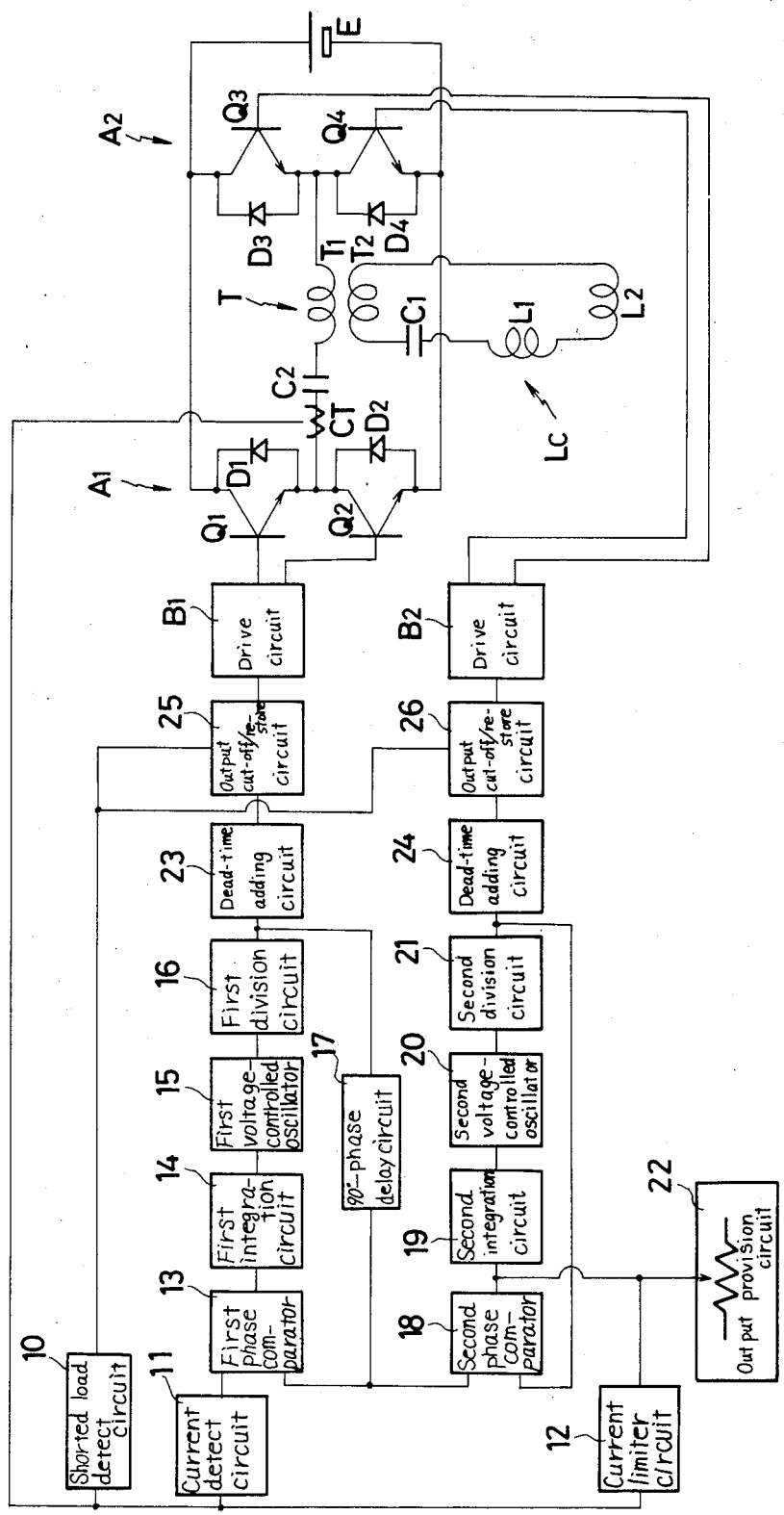
FIG. 3 is a simplified block diagram of circuits of the high-frequency power-supply output control device being applied to the resonance load.

FIG. 3 is the simplified block diagram of various circuits of a high-frequency power-supply output control device related to the present invention when this device is applied to an induction heater. Those component elements having reference numerals identical to those shown in FIG. 1 are provided with identical constitutions to those which were described in reference to FIG. 1, thus description of these is deleted here.

Work coil L2 which substantially makes up an induction heater is connected to resonance circuit LC which makes up load in the main circuit block in series. Capacitor or C2 of the main circuit block prevents power-output transformer T from DC-magnetization. Current transformer CT detects current from the load for delivery to shorted-load detection circuit 10, current detection circuit 11, and current limiter circuit 12, respectively.

The first phase comparator 13, the first integration circuit 14, the first voltage-controlled oscillator 15, the first division circuit 16, and 90°-phase delay circuit 17 respectively constitute the main phase synchronizing loop which locks 90° of the phase.

One of the input terminals of the first phase comparator 13 receives a signal which was converted from the output current into a square waveform by current detection circuit 11 before causing its phase to be advanced by 90°.

The other input terminal receives a signal which was first outputted from the first voltage-controlled oscillator 15 via the first integration circuit 14 making up a low-pass filter and then divided into one-half by the first division circuit 16 so that the duty cycle can correctly be reduced to 50% before eventually allowing 90°-phase-delay circuit 17 to delay the phase by 90°.

Next, frequency output from the high frequency power supply source is processed by the main phase-synchronizing loop so that this frequency can correctly match the resonance frequency of load resonance circuit LC while the maximum power is outputted.

The second phase comparator 18, the second integration circuit 19, the second voltage-controlled oscillator 20, and the second division circuit 21 respectively constitute the phase synchronizing loop which locks the phase at 0° and generates a signal having the phase difference $\phi$.

One of the input terminals of the second phase comparator receives a 90°-phase-delayed signal output from the 90°-phase-delay circuit 17 of the main phase synchronizing loop. The other input terminal of the second phase comparator 18 receives a signal which was first outputted from the second voltage-controlled oscillator 20 via the second integration circuit 19 and then divided into one-half by the second division circuit 21 before correctly reducing the duty cycle to 50%.

The input terminal of the second integration circuit 19 receives DC current from the output provision circuit 22 comprised of a variable resistor together with a signal from the second phase comparator 18, while this input is connected to the current limiter circuit 12 which causes the phase difference $\phi$ of the output current to diminish itself when current output from the current limiter circuit 12 exceeds a specific value.

Signals outputted from those two phase-synchronizing loops are then delivered to a pair of drive circuits B1 and B2 respectively dealing with arms A1 and A2 via dead-time adding circuits 23 and 24, and the output cut-off and return circuits 25 and 26, respectively.

The dead-time adding circuits 23 and 24 causes transistors Q1 through Q4 to slightly delay their output operations from each other to prevent all transistors Q1 through Q4 from simultaneously turning themselves ON. The output cut-off and return circuits 25 and 26 respectively act upon an overcurrent (e.g. resulting from a shorted load) signal from short load detection circuit 10, which acts when the response from the current limiter circuit 12 is too late, to cut off the output and then restore it as soon as overcurrent is off.

The high frequency power supply output control device having the constitution described above when being applied to an induction heater securely allows the phase difference $\phi$ to be varied from zero to a maximum of 180° by variably controlling DC current flowing through the output provision circuit 22. As a result, this makes it possible for the device embodied by the present invention to variably control the DC current output from zero to the predetermined maximum value by effectively applying the phase difference $\phi$, thus allowing the output from work coil L2 to be controlled satisfactorily.

The semiconductive inverter embodied by the present invention deals with transistors Q1 through Q4, and drive circuits B, B1, and B2 driving these transistors.

Likewise, two units of the phase-synchronizing circuits respectively deal with the first phase comparator 13, the first integration circuit 14, the first voltage-controlled oscillator 15, the first division circuit 16, and 90°-phase-delay circuit 17 constituting the main phase synchronizing loop, and also the second phase comparator 18, the second integration circuit, the second voltage-controlled oscillator 20, and the second division circuit constituting the other phase synchronizing loop, respectively. The phase-difference varying circuit deals with the output provision circuit 22.

It should be understood, however, that the spirit and scope of the present invention is not limitative of those preferred embodiments described above.

What is claimed is:

1. A high frequency power supply output control device comprising
    a semiconductor inverter circuit for converting DC power into high frequency power and comprising a pair of arms, each arm comprising a pair of semiconductors, said semiconductors of each arm being connected in a bridge configuration;
    a transformer connected to said pair of arms;
    a resonant circuit comprising at least one coil and a capacitor and connected to said transformer;
    means for activating push-pull operation of said pair of arms simultaneously with alternate ON-OFF drive operation of said pair of arms;
    a pair of phase synchronizing circuits for dealing respectively with said pair of arms and for setting operating frequencies of said semiconductors of each of said pair of arms at a specific value; and
    a phase difference varying circuit for controlling output power by varying phase difference between said pair of phase synchronizing circuits.

2. The device of claim 1, wherein further comprising a blocking capacitor connected between said transformer and one of said pair of arms.

* * * * *